Feb. 22, 1938.  G. A. MATHIEU  2,108,867
RADIO DIRECTION SYSTEM
Filed Feb. 16, 1935     2 Sheets-Sheet 1
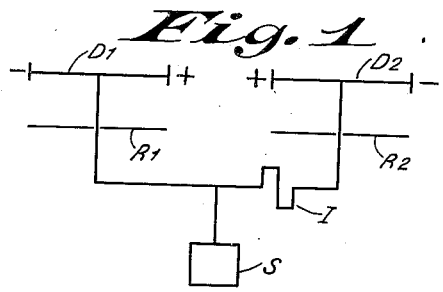
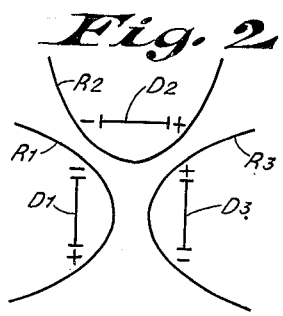
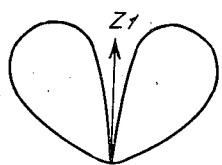
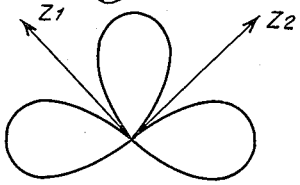
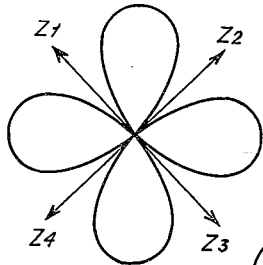
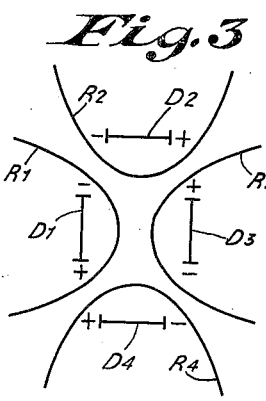
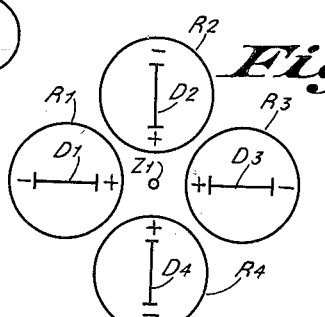
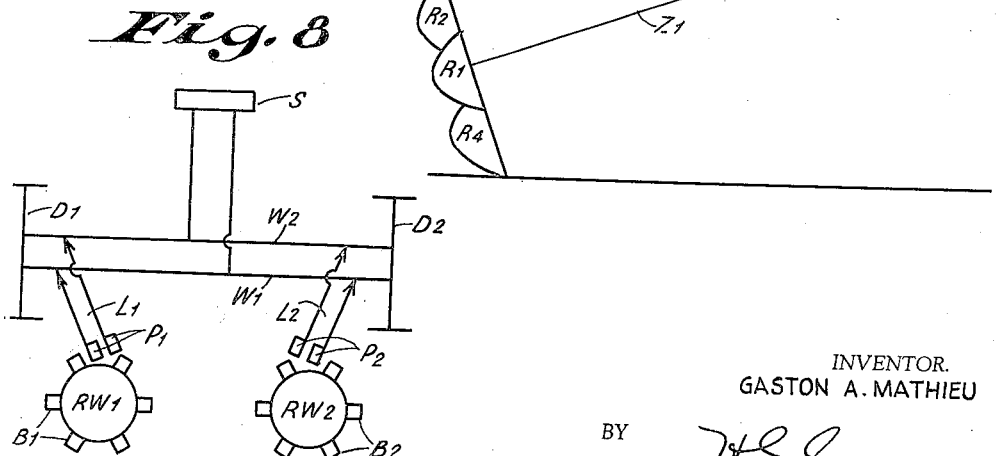
INVENTOR.
GASTON A. MATHIEU
BY
ATTORNEY.

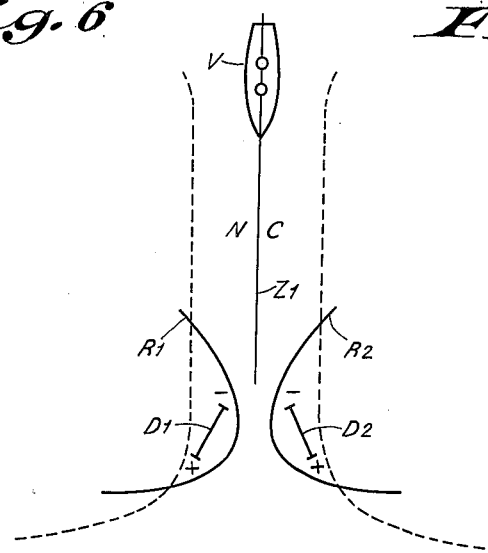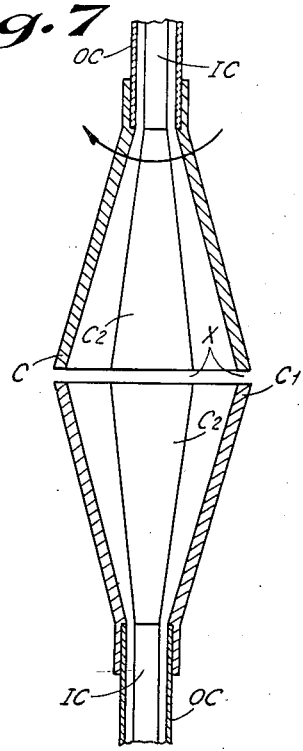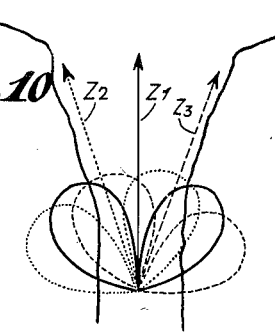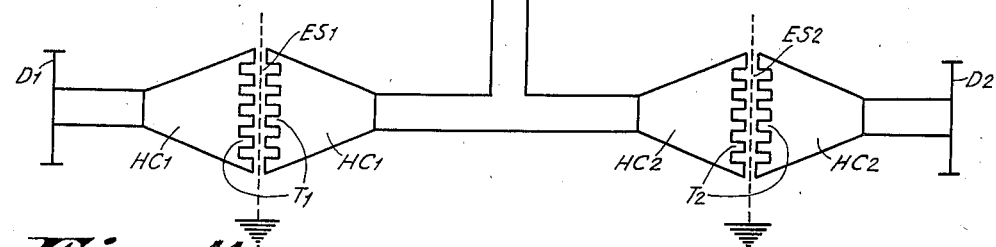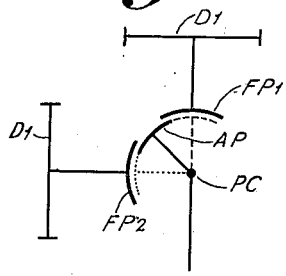

Patented Feb. 22, 1938

2,108,867

UNITED STATES PATENT OFFICE 2,108,867

RADIO DIRECTION SYSTEM

Gaston Adelin Mathieu, Shirehall Park, London, England, assignor to Radio Corporation of America, a corporation of Delaware Application February 16, 1935, Serial No. 6,882
In Great Britain January 27, 1934

9 Claims. (Cl. 250—11)

This invention relates to directional radio systems suitable for use for navigation purposes.

Directional radio transmitting systems offer many well known advantages for navigation purposes and numerous proposals have been made to employ such systems for such purposes. For example, it has been proposed to construct so-called wireless lighthouses or beacons which emit continuously rotating or fixed or oscillating directional beams of radiation and to equip ships or aircraft with cooperating radio receivers so as to enable them to be navigated under conditions where ordinary navigation aids, such as ordinary lighthouses are useless or unsatisfactory.

One of the difficulties met with in known radio transmitting systems for navigation purposes is that the directional qualities of the transmitters have not been as sharp and definite as is required. For example, in that well-known class of transmitting system wherein a radiation characteristic of figure of eight shape is obtained, the points of maximum and minimum field strength are not as definite and sharp as is often required.

The main object of the present invention is to provide a radio transmitting system suitable for use for navigation purposes and wherein the above-mentioned disadvantage is eliminated or reduced. As will be seen later, the present invention provides directional radio transmitting systems wherein fairly broad directional radiation is obtained and according to the said invention, a definite narrow predetermined direction or directions (which may be fixed or movable) is characterized by the creation of one or more narrow zones of silence, the said narrow zone or zones of silence defining said predetermined direction or directions and serving for navigation assisting purposes.

In one way of carrying out this invention a radio transmitting system suitable for use for navigation purposes comprises a plurality of horizontally polarized aerials or aerial systems and means for energizing said aerials or aerial systems with the same frequency but in different phase, the arrangement being such that the resultant radiation characteristic contains a minimum or minima in directions in which mutual interference between and substantially mutual cancellation of the radiated energies emitted by the aerials or aerial systems occur.

Though not limited thereto, the invention is particularly well adapted for, and is primarily intended for, use with very short waves (so-called micro waves) of the order of 1 metre or less in length. Where such wave lengths are in question, the aerials employed are preferably dipoles.

Preferably in carrying out this invention reflectors are associated with the dipoles or other aerials employed to prevent rearward radiation therefrom and thereby to reduce the number of minima in the radiation characteristic.

Where the present invention is applied to a very short wave system involving the emission of a rotating radiation characteristic, difficulties may arise if known coupling and connection systems are employed to connect rotating aerials with an energizing high frequency system. A feature of the invention therefore resides in the provision of a form of coupling system well adapted for such duty and which presents substantial advantages as regards efficiency and simplicity.

Another feature of the invention resides in the provision of certain improved and simple modulating systems for modulating radiations emitted from ultra short wave length aerials employed in carrying out this invention.

The invention is further described with the aid of the accompanying drawings in which:

Figure 1 shows a schematic diagram of a transmitter arrangement having two oppositely phased dipoles;

Fig. 2 shows a modification in which three dipoles are used at the transmitter;

Fig. 3 shows still another modification using four dipoles;

Figs. 1a, 2a and 3a show respectively the radiation patterns produced by each of the devices of Figs. 1, 2 and 3;

Fig. 4 shows a system of four radially disposed dipoles each having a reflector, the arrangement being such as to produce a sharply concentrated "zone of silence" the axis of which is perpendicular to the common plane of the dipoles;

Fig. 5 shows in elevation how the zone of silence produced by the device of Fig. 4 may be used for making an aircraft landing;

Figs. 6 and 10 illustrate a use of my invention in navigating a harbor or channel;

Fig. 7 shows means for symmetrically coupling a plurality of dipoles to a common source of energy;

Fig. 8 shows a modulating means which is in effect an electrostatic short-circuiting switch useful in any of the herein shown systems of my invention;

Fig. 9 shows a modified switching means for keying purposes;

Fig. 11 shows an arrangement for energizing two dipoles in phase opposition; and Fig. 12 shows a modification in which one dipole is fixed and the other is made rotatable about its own center.

Referring to Figure 1 which shows schematically one way of carrying out the invention, a transmitting station comprises two dipoles $D_1$, $D_2$, arranged in the same straight line and each energized from a common source S with the same ultra short wave frequency (e. g., one of 60 centimeters wave length) at substantially the same amplitude but in phase opposition, so that the adjacent ends of the two dipoles are at a given instant of like polarity as indicated by the + and — signs. The required phase displacement may be obtained in any convenient way, for example, by reversing the connections of the two elements of one of the dipoles relatively to a feeder common to both, or as indicated in Figure 1 by making the feeder length to one dipole a half wave length, or an odd multiple of a half wave length longer than that to the other. In Figure 1 an interposed extra half wave length is represented diagrammatically at I. The radiation characteristic of such an installation will consist of a modified figure of eight diagram, the modification consisting in the provision of two sharp minima (zones of silence) in a line at right angles to the line in which the normal minima of a figure of eight diagram lie. In other words, the radiation characteristic obtained consists of four loops which are symmetrically arranged but with unequal spacing, the loops consisting of two pairs of loops there being less separation between the loops of each pair than there is between any loop in one pair and the adjacent loop in the other. Thus, there are two sharp minima and two less sharp minima, the sharp minima being due to the interference of waves 180° out of phase. If the amplitudes fed to the two dipoles are equal these minima will be very sharp, but will become less sharp as the condition of equality of amplitude is departed from. In practice if the amplitudes do not differ by more than about 5%, the zone of silence will be sharp enough for most practical purposes.

The embodiment of Figure 1 as so far described has the disadvantage that it does not easily enable a "sense" indication to be given and it is preferred therefore to provide a reflector behind each dipole. Such reflectors are represented diagrammatically in Figure 1 at $R_1$ and $R_2$. The result of this is to cancel one half of the radiation characteristic just described and provide a radiation characteristic as shown in Figure 1a and consisting of two loops with a sharp defined minimum (zone of silence) in a direction $Z_1$ between them and a very flat minimum behind them, there being two maxima of equal intensity.

In a further modification illustrated in Figure 2, three dipoles $D_1$, $D_2$, $D_3$, are employed, said dipoles being all in the same plane (normally a horizontal plane) and mutually perpendicular, each dipole being along one of three sides of an imaginary rectangle as shown. A reflector $R_1$, $R_2$, or $R_3$ is arranged behind each dipole, i. e., on the inward side of the imaginary rectangle. The dipoles are energized (by means not shown) in such phase relationship that at any instant the adjacent ends of any two adjacent dipoles are of like polarity, as indicated. The radiation characteristic resulting from this arrangement will consist, as shown in Figure 2a, of three loops having fairly sharp maxima in mutual perpendicular directions, there being a sharp minimum (zone of silence) in a direction ($Z_1$ or $Z_2$) bisecting the right angle between any two "maximum" directions and a second relatively flat minimum in a direction making an angle of 135° with each of the sharp minimum directions.

In a modification illustrated in Figure 3, a fourth dipole $D_4$ with associated reflector $R_4$ is added, this fourth dipole being along the fourth side of the imaginary rectangle. Energization of the dipole is, as before, in such phase relationship that the adjacent ends of any two adjacent dipoles are at any instant of like polarity. The radiation characteristic obtained will be as shown in Figure 3a with four sharply defined minima (zone of silence) in directions $Z_1$ $Z_2$ $Z_3$ $Z_4$.

In a further modification illustrated in Figures 4 and 5 suitable for use with aircraft for assisting them to land in fog, for example, four dipoles $D_1$, $D_2$, $D_3$, $D_4$, in a plane, are employed each dipole being arranged along one of four mutually perpendicular radii. The dipoles are energized in such manner that the inner ends of all four dipoles are at any instant of like polarity. Thus, two of the dipoles will be horizontally polarized and will radiate interfering waves in the manner required by this invention while the other two will be vertically polarized and will also radiate interfering waves. A reflector $R_1$, $R_2$, $R_3$, or $R_4$ is arranged behind each dipole and the result obtained will be to produce a "zone of silence" in a direction at right angles to the plane of the dipoles and passing through the imaginary centre between them. The whole installation may be arranged, for example, as shown (purely schematically and not to scale) in Figure 5, at an airport and mounted at a slight angle to the vertical so that the direction $Z_1$ of the line or "zone of silence" makes a slight angle to the horizontal, the angle being so chosen that an aircraft A following the line of the "zone of silence" can land satisfactorily without the pilot seeing the ground until he is quite close thereto.

In this arrangement it would be convenient to modulate each dipole separately with a different frequency and to provide an aeroplane with indicating means actuated by the respective modulations so as to indicate to the pilot whether he is above or below and/or to the right or the left of the proper landing line.

In a still further modification illustrated in Figure 6 and suitable for use for providing a "bearing lead" for leading ships into harbor, a pair of dipoles $D_1D_2$ at about 45° to each other are provided, each dipole having a reflector $R_1$ or $R_2$ behind it, the two reflectors being between the two dipoles. The reflectors need not, of course, be at 45° as other angles are possible—for example, a 90° arrangement is quite convenient. The result obtained with the arrangement illustrated in Figure 6 is to give a sharp minimum in a direction $Z_1$ bisecting the angle between the dipoles, and if the dipoles are so arranged that this direction is the direction of navigable channel NC a vessel V can navigate that channel in safety by the aid of a radio receiver adapted to inform the pilot that his ship is headed correctly on the line.

In any of the embodiments so far described, the reflectors employed may be of any known kind; for example, they may consist of plane reflectors, parabolic reflectors or so-called "fish-bone" tuned reflectors, i. e., reflectors consisting of a number of radiators at right angles to a central support the radiators being tuned (by reason of their lengths)

to the working wave length. It will also be appreciated that the sharpness of the minima or maxima obtained will be influenced by the angle in which the dipole and reflector units are placed relatively to one another and this angle may obviously be chosen to produce desired results in particular cases. Further in some cases two dipoles may be placed in association with the plane reflector.

It will be obvious that if any of the systems above described be rotated physically, the resultant radiation diagram will rotate and thus a rotating beacon effect will be obtained. Where very short waves are in question, this rotation of the aerial system may lead to difficulties in coupling the said system to its energizing transmitter, and an important subordinate feature of the invention accordingly resides in the provision of a special coupling arrangement now to be described. In this arrangement, energy is fed to the aerial system through a high frequency feeder of the concentric tubular type, i. e., of the type wherein one of the conductors is constituted by a tube or rod which is mainly air spaced from and is centrally arranged within an outer conductive tube which constitutes the second conductor. At some convenient point where the coupling is to be effected, this concentric feeder is cut and a double concentric cone arrangement now to be described and illustrated in Figure 7 is inserted. This double concentric cone arrangement consists of two portions which are electrostatically coupled, the electrostatic coupling providing the necessary coupling between feeder and aerial load. Each portion consists of an inner conically shaped conductor rod or tube $C_2$ concentrically arranged within an outer conical shaped conductor $C_1$. The small diameter ends of the outer conical conductors $C^1$ are attached to and are of substantially the same diameter as the outer conductors OC of the concentric tubular feeder and similarly the small ends of the inner conical conductors are attached to and are of substantially the same diameter as the inner conductors IC of the feeder. The angles of the inner and outer conical members are such that at any transverse plane the ratio of the inner periphery of the outer conical conductor to the outer periphery of the inner conical conductor is the same or substantially the same as the ratio of the inner periphery of the outer conductor of the concentric tubular feeder to the outer periphery of the inner conductor of that feeder taken in a transverse plane. The large diameter ends of the conical portions just described are spaced at X a short distance apart the two conical structures being co-axial. The feeder members IC OC at one end lead to the dipoles and those at the other to the transmitter. Owing to the space at X the tapered conical arrangement to one side of this space may be rotated relative to that to the other and energy coupling is obtained by virtue of the capacity coupling existing across X. It will be seen that with this coupling arrangement the need for any kind of rubbing contact or brush is obviated while the electrostatic coupling arrangement is such that the impedance relations are not substantially disturbed or sharply changed and little, if any, loss is introduced. Any desired coupling capacity can be obtained by appropriately dimensioning the conical portions and their spacing from one another.

The "bearing lead" embodiment previously described herein may, as can the other systems described in this specification, be mounted upon a turntable and rotated so as to give a rotating beacon effect, and in such a case it will be necessary to provide means to enable a receiving station to learn the instantaneous direction of the beacon at any instant. Any known arrangement may be employed for this purpose; for example, it may be arranged to modulate the carrier wave transmitted with one of two audio frequencies, e. g., with 600 cycles per second or with 1,000 cycles per second, and to change over the modulation at some predetermined point—for example, when the beacon is pointing due north. One convenient way of doing this is to obtain the modulation from a back coupled audio frequency thermionic valve oscillator having a frequency determining circuit including two shunt condensers one of which is arranged to be switched in and out at appropriate instants by a switch actuated, for example, by a striker member arranged to be struck by a pin rotating with the turntable or shaft rotating the aerial system.

With a navigating arrangement such as the fixed "bearing load" arrangement, above described, it is obviously desirable to provide means for distinguishing when a ship is to the right or to the left of the "bearing lead". A convenient way of doing this is to associate with each dipole what is in effect an electrostatic short circuiting switch which short circuits its associated dipole at a predetermined frequency.

For example, as shown in Figure 8, two dipoles $D_1$, $D_2$ may be connected together by parallel wires $W_1W_2$ which are energized centrally from a transmitter at S and at points on these wires adjacent each dipole, pairs $L_1L_2$ of leads, each one half wave length long, may be connected. The leads of each pair are parallel to one another and terminate in pairs $P_1P_2$ of conductive plates, the plates of each pair being spaced a short distance from each other. Near each pair of plates is arranged a rotating wheel $RW_1$ or $RW_2$ each having a plurality of blades $B_1$ or $B_2$ projecting from its periphery and the arrangement is such that when either wheel is rotated the projecting blades thereof in effect short-circuit in succession one of the dipoles since the blades of each wheel, as it rotates, will successively cooperate with the plates $P_1$ or $P_2$, and thus provide what may be termed an electrostatic short circuit. The frequency of short circuiting of either dipole will depend upon the number of blades projecting from the appropriate rotating wheel and the speed of rotation of the wheel.

Alternatively separate oscillators oscillating in phase and separately modulated may be used for the dipoles or a single oscillator driving two amplifiers which are separately modulated may be employed.

A still further modification, which in principle resembles the above rotating wheel arrangements, will now be described with reference to Figure 9. In this modification the energy supply circuit to each dipole includes an electrostatic coupling between the enlarged ends of a pair $HC_1$ or $HC_2$ of co-axial hollow conical conductors arranged base to base. The annular bases of the conical conductors have regular teeth $T_1$ or $T_2$ cut out therefrom, the teeth being opposite to one another. A perforated or toothed earthed screen $ES_1$ or $ES_2$ is arranged between the toothed ends of the conical conductors of each pair and it will be seen that by rotating this screen modulation of the dipole energization will be obtained, this modulation depending upon the speed of rotation of the screen and the number of perforations or teeth therein.

In a further modification, illustrated in Figure 10, of the "bearing lead" arrangement above described, the dipole installation is arranged to take up periodically an oscillatory movement from left to right and back again and the transmitter is modulated by one audio frequency (say 2,000 cycles per second) when it is at one end of an oscillatory movement (that is to say when the zero signal direction is $Z_2$) by another frequency (say 600 cycles per second) when it is at the other end (i. e., when the zero signal direction is $Z_3$) and by a third audio frequency (say 1,000 cycles per second) when it is at rest in its normal position, which is the position between the extreme positions of oscillation and that which gives the appropriate guiding zero signal direction $Z_1$. With such an arrangement a ship following the correct course ($Z_1$) will receive nothing when the transmitter is at rest in its normal position, but if the ship be to one side of the correct guiding line, it will receive a continuous strong signal depending upon which side it is. When the transmitting aerial system oscillates, a ship on the correct guiding line will receive first one frequency (that corresponding to left hand directivity of the transmitter) and then another (that corresponding to right hand directivity) both these frequencies being heard with the same intensity. If, however, the ship is to one side of the proper course, it will not hear the two frequencies at like intensity and that which predominates will indicate to the navigation officer the direction towards which his ship should be navigated or away from which his ship should be navigated according to the electrical connections at the receiver. The advantage of this oscillating guiding beacon system is that it obviates the psychological difficulty which would arise were the beacon stationary, namely, that a ship when properly navigated in the correct direction would not hear any signals at all and the navigation officer might therefore be in doubt as to whether the guiding beacon were functioning or not.

The "zone of silence" which is the characteristic feature of systems in accordance with this invention can be produced either permanently or periodically as may be desired and where periodic production is required this may be obtained by periodically altering the relative amplitude fed to one or more aerials in the system or by periodically altering the relative phase or the polarization, and such alteration may be effected either suddenly or progressively. In the modification represented in Figure 11, the two dipoles $D_1$ and $D_2$ are energized in phase opposition through capacity coupling between the arcuate plate AP and the fixed plates $FP_1$ and $FP_2$. The plate AP, to which the energizing feeder is connected, is either rotated or swung about the centre PC. When AP is in the position shown in full lines the aerials $D_1D_2$ are equally energized in phase opposition and a "zone of silence" is produced. When AP is in the dotted line position only $D_2$ is energized and when it is in the broken line position only $D_1$ is energized.

In the arrangement schematically illustrated in Figure 12 one dipole $D_1$ is fixed and the other rotated about its own centre. In this way the polarization and phase of one aerial is progressively changed. A sharp zone of silence will only be produced for the position (and instantaneous relative polarities) while when $D_2$ has rotated through 180° from the illustrated position, the zone of silence will be replaced by a zone of marked increase of signal strength, the result being intermediate between these two extreme results for intermediate positions of $D_2$. Another way of changing the relative phase position is periodically to reverse the connections to one dipole or periodically to cut into and out of its feeder an extreme half wave length of feeder (or an odd multiple thereof).

In all those figures in which reflectors are not illustrated, they can of course be provided. Where very short wave lengths are in question (60 centimeters or thereabouts) reflectors will be quite cheap and small, and mechanically easily arranged to be rotated, if required.

Where the invention is required to be used for providing a guiding line for guiding a ship into or out of harbor, it is in practice generally preferable to "swing" the zone of silence rather than rotate it and to indicate when the said zone is in the center of its swing by changing the modulation at this particular time; alternatively, an arrangement such as that illustrated in Figure 11 or 12—i. e., an arrangement wherein the zone of silence is periodically produced—may be used to good advantage for this particular purpose, means being provided for changing a superimposed modulation note at the times when the zone of silence is produced. If this is done, the receiver will, of course, obtain zero signal when on the guiding line and if this is an undesirable operating feature—and in many cases a "negative result" of this nature is undesirable—the difficulty may be met by periodically and alternately (e. g. every 10 seconds) switching off the energization of one transmitting aerial and simultaneously transmitting a distinctive signal with the other, the two distinctive signals being different. With this expedient a receiver on or near the guiding line will receive at intervals a strong signal indicating upon which side of the guiding line it is, while at other times zero or only a weak signal will be received.

In systems in accordance with this invention and wherein a swinging or rotating beacon effect is obtained and a predetermined direction of that beacon characterized by a change of modulation, receivers for use in the system may be equipped with visual indicating means responsive to the modulation. For example, where one note modulation is transmitted when the "beacon direction" is to one side of a guiding line and another when it is to the other, the change over occurring sharply at the passage through the guiding line, the receiver may comprise a demodulator whose output is passed to two filters each responsive to one or other note. The output from each filter is rectified and the rectified current passed to one or other winding of a differential galvanometer having a needle moving over a scale half of which is colored red and the other half green. So long as the receiver is on or near the guiding line, the galvanometer needle will move regularly and smoothly from side to side the amplitudes of swing on each side of the centre line being about equal. The colors on the scale are so positioned and the arrangement is such that if the course of the vessel carrying the receiver is too far to port the amplitude of the needle swing over the red part of the scale becomes bigger than that over the green, thus giving the information from which the course can be corrected. In addition to or instead of such visual indication, of course, the necessary information can be obtained by listening to the modulation tones in head 'phones or upon a loud speaker.

Having now particularly described and ascertained the nature of my said invention and in what manner the same is to be performed, I declare that what I claim is:

1. A directional radio transmitting system having a plurality of energy radiating elements, means common to the radiating elements for energizing the same, and polarizing means for causing beams of energy simultaneously radiated from each of said elements to mutually interfere and neutralize one another along a plurality of sharply defined and substantially parallel zones intermediate between the axes of maximum field strength between said beams.

2. A system in accordance with claim 1 and having said energy radiating elements constituted each by a directional dipole antenna.

3. A system in accordance with claim 1 and having energy focussing reflector elements associated each with one of said energy radiating elements for concentrating the energy radiated in substantially well defined beams.

4. A radio beacon transmitting system for use in navigation having a plurality of dipole aerials symmetrically arranged one with respect to another about a common center of symmetry, a plurality of reflecting elements similarly disposed with respect to each dipole in a common plane, means for so orienting said dipoles and their associated reflectors that polarized beams of energy may be radiated in substantially parallel columns and means for feeding energy to said elements in such manner that sharply defined zones of neutralized field intensity intervene between the respective beams radiated from each dipole and its associated radiator.

5. A system in accordance with claim 4 and having a source of energy common to said dipole aerials, parallel conductors connecting said source with each half of each dipole and modulating means for electrostatically short-circuiting said conductors.

6. A directional radio transmitting system comprising a plurality of dipole antennas arranged to radiate differently polarized radiations simultaneously but each with its axis of maximum intensity differently directed, a common source of energy, and rotatable electrostatic means for coupling said source to said antennas in such manner that the energy fed to said antennas is keyed on and off in unison, thereby to produce a narrow zone of silence as a result of interference between each two adjacent zones of radiation of the respective antennas.

7. A directional radio transmitting system according to claim 6 and having a transmission line for feeding the energy from said source to said antennas, and means for intermittently and capacitively short circuiting the two sides of said line at a periodic rate.

8. A directional radio transmitting system according to claim 6 and having a transmission line of the concentric conductor type for feeding the energy from said source to said antennas, said line including an electrostatic coupling arrangement having two sets of concentric conductive cones whose base portions are coaxially opposed to one another and separated by a dielectric, the inner and outer cones of each set being connected respectively to the inner and outer conductors of said transmission line.

9. In a coaxially conductive transmission line between a source of energy and an antenna system, coupling means interposed between a rotatable portion and a stationary portion of said line comprising two sets of concentric conductive cones whose base portions are coaxially opposed to one another and separated by a dielectric, the apex ends of said cones being connected to different portions of said transmission line, one of the cone sets being rotatable with the transmission line portion to which it is connected.

GASTON ADELIN MATHIEU.